United States Patent
Lee (10) Patent No.: US 9,945,565 B2
(45) Date of Patent: Apr. 17, 2018

(54) STOVETOP WOK COOKING SYSTEM

(71) Applicant: WOKMON CORPORATION, North Bergen, NJ (US)

(72) Inventor: Glen Lee, North Bergen, NJ (US)

(73) Assignee: Workman Corporation, North Bergen, NJ (US)

( * ) Notice: Subject to any disclaimer, the term of this patent is extended or adjusted under 35 U.S.C. 154(b) by 416 days.

(21) Appl. No.: 14/708,207

(22) Filed: May 9, 2015

(65) Prior Publication Data

US 2016/0327282 A1 Nov. 10, 2016

(51) Int. Cl.
*A47J 37/10* (2006.01)
*F24C 15/10* (2006.01)

(52) U.S. Cl.
CPC ......... *F24C 15/107* (2013.01); *A47J 37/108* (2013.01)

(58) Field of Classification Search
CPC .............................. F24C 15/107; A47J 37/108
USPC ........................................................ 126/215
See application file for complete search history.

(56) References Cited

U.S. PATENT DOCUMENTS 5,179,932 A * 1/1993 DeCarlo ............. A47J 37/0763
126/9 R
2010/0024796 A1* 2/2010 Lee ......................... F24C 3/085
126/215

* cited by examiner

*Primary Examiner* — Avinash Savani
(74) *Attorney, Agent, or Firm* — Yong Chen (57) ABSTRACT

A stovetop wok cooking system, including a wok support assembly and a flame focusing ring. The wok support assembly includes a conical shaped fireproof main structure and spaced leg assemblies. The main structure includes a top wok support end portion and a bottom wok support end portion. The top wok support end portion includes a series of spaced bumps thereon to provide clearance for flames, and an upper lip. The bottom wok support end portion has a circular bottom support opening and a rounded rim. A clip is configured to slideably engage the rounded rim. Each leg assembly slides about the top wok support end portion and the bottom wok support end portion during use to an operative position for supporting the wok support assembly on varying stovetop designs. The flame focusing ring is adapted to be placed upon a stovetop and nested within the wok support assembly. In some embodiments the wok has a fixed handle. In other embodiments the wok is adjustably connected to the handle.

17 Claims, 9 Drawing Sheets

STOVETOP WOK COOKING SYSTEM

BACKGROUND OF THE INVENTION

1. Field of the Invention

The present invention relates generally to gas burner attachments and more particularly to a stovetop wok cooking system utilizing a wok support ring with a versatile leg assembly for utilization on varying stovetop designs; and, a flame focusing ring for encircling a gas burner and directing the flames upwardly and inwardly to concentrate the flame on the bottom center of a wok.

The present invention also relates to improvements in utensils, especially household utensils, and more particularly to improvements in household utensils including those known as woks and analogous cookware which can be utilized for stir-frying meats, fish, vegetables and/or other edible foodstuffs.

2. Description of the Related Art

The development of the traditional wok by the Chinese over 2,500 years ago was necessary from the tough living conditions in China. Scarce supply of firewood forced the frugal Chinese to devise the present day methods of flash-flame cooking or better known as stir-fry.

The stir-frying technique involves the use of a Chinese wok, which usually requires cooking of vegetables and meats for very short time periods at high heat. In a typical stir-fry recipe, the cooking time is three to five minutes, or less. The health benefits of short-time cooking with minimal use of fats are substantial. Less fat is absorbed by the food being cooked in a wok than with western methods and resulting fat intake by the consumer is at a minimum. In addition to the health benefits, the flavor of the food, particularly vegetables, is substantially retained by the high heat searing of the food surfaces.

Chinese restaurants can attain these high temperatures by using commercial burners that reach over 200,000 BTU's (British Thermal Units). The typical American gas stove burner outputs an average 7,000 to 18,000 BTU's maximum. The commercial burners are able to bring the surface temperature of the wok to over 700 degrees F. to impart what Chinese experts say is the elusive "Wok Hei". "Hay", the Cantonese Chinese pronunciation, or "chi" or "qi", the Mandarin Chinese pronunciations (the ones most familiar to the non-Chinese reader), is breath—the Chinese concept of vital energy that flows through the body. Chinese chefs stress that Wok Hei must be achieved on the surface of the wok as the primary directive. This is not an issue for Chinese restaurants.

For wok cooking on a regular gas stovetop, Wok Hei is quite elusive because of the insufficient amount of BTU's generated by the average domestic gas stove. This has given rise to a number of innovative wok designs in addition to the traditional cast-iron or stamped carbon steel woks that have entered the market. Today's Asian woks are manufactured in stainless steel, flat bottom, layered-steel/aluminum/steel, aluminum Teflon coated and electric/Teflon bottom. These types of woks have lured cooks away in the past, however, many devotees are returning to the faithful old cast iron or stamped carbon steel wok, because they respond most readily to changes in heat. Their thin gauge allows less time to heat up in preparation for cooking. Most commercially available Asian woks address certain aspects; heating, convenience and utility, however, they all are band-aids and miss their mark on the biggest issue in wok cooking: hi-temperature heat or Wok Hei.

Present day conventional gas stove burners are designed to take on all types of currently mass produced cookware. Practically all cookware is flat bottomed in nature. The typical western style stove burner emits a flame that fans outwardly as a pot or pan is placed on it. This design is most effective because it takes advantage of the entire flat surface area of the cookware.

In the case of the Asian wok, it's the opposite. The wok's unique round bottom and western burner causes the flame from a typical stovetop gas jet to mushroom out to its edges. This is an inherent design flaw of a round bottom type wok working in conjunction with a stove. The wok and the conventional stovetop jet burner are not a compatible match.

One of the main problems with the use of the wok in western kitchens is that it does not adapt well on electric and gas ranges. The wok was developed for use by placing it directly on rings with a wide based fire built underneath. However, the cooking surfaces utilized, particularly in the west, are typically flat for delivering heat to flat bottomed cooking vessels such as frying pans or sauce pans. The round dome surface of the wok does not adapt well to cooking on modern electric and gas ranges. Various methods have been utilized in attempts to overcome this problem.

One method involves modifying the structure of the wok itself. The production of flat bottomed woks for resting in a stable manner on a flat range top, has been done either by making the wok wall a uniform thickness and having both inside and outside have a flat bottom, in which case the wok is a little more than a high sided frying pan with all its inherent disadvantages, or by building the outside of the wok up only to leave a spherical cooking surface with a flat exterior surface. The disadvantage of this method is the cooking technique in spatula manipulation, i.e., movement of a metal spatula from a round surface to a flat plane. This can be discerning to those more accustomed to round bottomed woks. Flat bottomed woks do not permit the sweeping, surface-scooping motion of the round-edged spatulas used in wok cooking; where rapid, fluid motions are essential for effective stir-frying; and, flat bottomed woks do not permit the user to rock the wok smoothly over the heating surface in order to efficiently spread other ingredients to the food being cooked in the wok while keeping the wok in full contact with the heating surface. The other disadvantage of this method is that the weight and mass of the wok is increased.

Another modification to the wok has been the use of electric woks wherein the heating elements are arrayed in a partially spherical design at the bottom of the wok to provide even heat distribution. These woks are typically quite expensive and have the same disadvantages as the flat bottomed wok's unwieldiness. Their heat control thermostats are not sensitive enough for the quick temperature changes stir-frying demands. Another disadvantage of electric woks is that most of them are Teflon coated, which give rise to a potential health issue associated with the inhaling of toxic fumes when the surface temperature exceeds 450 degrees F.

Those who wish to attain the advantage of cooking in a traditional thin walled wok have been forced either to abandon the use of modern ranges or else to utilize some form of interface adapter between the range and the wok. The alternate heating methods are less than desirable since they force the user to abandon the range top, the most commonly used cooking area in the kitchen. Thus, interface adapters have become popular.

The interface adapters manufactured to date have been rings or collars which are adapted to fit on the range element surface to provide a circular ring upper surface into which the wok bottom nests in a fairly stable fashion. Lack of stability is a major disadvantage of prior art interface adapters.

Electrical range elements are typically spiral elements with spaces between different portions of the element. In this manner, the bottom surface of the adapter ring will typically rest partially on the element and partially on the spans between portions of the element. Since the shape and size of the electrical elements varies drastically from stove to stove, this can often result in an unstable circumstance. Instability can be a great disadvantage since spillage of cooking oil can lead to kitchen fires and severe burns to the user.

The problem is even more notable in gas ranges which typically have only an open latticework frame to support the cooking vessel with wide spaces between the various elements of the frame. There is a greater danger of instability of the adapter rings on this sort of latticework than even on the electrical elements.

Another disadvantage of prior art adapter rings or collars is that the heat is delivered to the wok in an uneven fashion. Thermal energy is delivered directly by conduction to the ring portion of the wok where the top of the adapter ring and the wok directly interface. However, the remaining portions of the wok must either be heated by radiant energy or by indirect conduction. Consequently, a hot ring area may develop part-way up the sides of the wok, particularly if the wok is constructed of less than optimal material. This provides for uneven cooking and does not provide the maximum heat to the very bottom of the wok where most of the actual cooking takes place.

In summary, a regular home stovetop gas jet burner normally spreads flames outwardly away from the center to cover a large area on a flat pan, which is not effective for a wok which needs a very hot flame in the bottom center of the wok, and ordinary home stoves are unsatisfactory for supporting spherical bottoms of Asian wok cooking vessels.

U.S. Pat. No. 4,006,676, issued on Feb. 8, 1977 to Adamis, discloses a crepe pan that is adapted to distribute the batter over the flat exposed bottom surface of the bottom of the pan. A base locates and supports the pan in position and is so dimensioned as to surround the flame and distribute the heat evenly over the flat bottom of the pan; the weight distribution of the pan and its handle being such that the pan will be firmly seated around a suitable flange on a shoulder adjacent the flange of the substantially cylindrical base.

U.S. Pat. No. 5,315,983, issued May 31, 1994 to Law, describes a wok support ring comprising a two-piece support ring structure for supporting a wok cooking vessel on top of a burner cylinder of a cooking range. The structure features two components: a top ring of a substantially circular shape upon which sits a wok; and a base ring having a substantially circular shape that removably rests on the burner cylinder. The top ring removably rests on the base ring. The base ring itself comprises a first ring and a first mating means disposed on top of the first ring for removably coupling the base ring to the top ring. The top ring comprises a second ring upon which sits the wok and a second mating means projecting from the bottom of the second ring for removably coupling the top ring to the first mating means. The base ring further comprises a third mating means for removably coupling the base ring to the burner cylinder.

U.S. Pat. No. 5,775,316, issued Jul. 7, 1998 to Jones, describes a cooking range with interchangeable grate and wok ring mounted thereon. The range supports the wok ring and the grate over a gas fired burner element. The grate and the wok ring include a support plate which selectively engages the cooking range in a preferred orientation. The wok ring includes a preferred configuration of the support ring.

U.S. Pat. No. 5,345,062, issued Sep. 6, 1994 to Maudal, discloses a support stand which adapts an Asian WOK to a Western kitchen range. The stand provides an upper ring to receive a round bottomed WOK; the ring has sufficient diameter to accommodate the WOK securely in the stand. The base of the stand adapts to prior art drip pans placed in heating wells, where the well has gas or electrical heating elements located according to the type of range, and thus anchors the stand to the kitchen range top. A second concept modifies existing drip pans to provide both the functions of drip pan and support stand in a single, combined support stand. This stand replaces existing stands and drip pans and anchors the WOK to the kitchen range top. A third concept converts a prior WOK fire ring into a trivet allowing use of the WOK at a dinner table.

U.S. Pat. No. 6,718,967, issued Apr. 13, 2004 to Luther, discloses a wok support for use in a wok range which incorporates a refractory insulating material into its structure. The wok support includes a tubular support structure having internal space in its wall. The refractory insulating material is disposed in the internal space.

U.S. Pat. No. D250,931, issued Jan. 30, 1979 to Pierce, provides the ornamental design for a gas saving grate.

U.S. Pat. No. D364,534, issued Nov. 28, 1995 to Brown, discloses the ornamental design for an adapter for elevating an accessory above a stove heating element.

U.S. Pat. No. D545,124, issued Jun. 26, 2007 to Hawkins, discloses the ornamental design for a wok ring.

While a number of prior art wok supports have been attempted to be used with gas burners on stove tops (as well as some for use with electric coils) and a number of rings of various types for focusing flames of stovetop gas burners, none of the aforementioned patents provide a ring for focusing gas jet stovetop burners in combination with a universal wok support to fit a wide variety of stovetop grates and suspend a wok an effective distance above the gas jet to receive the full effect of the focused gas jet on the bottom center of the wok.

In partial response to this problem, present applicant invented and is the patentee of U.S. Pat. No. 7,694,671, issued on Apr. 13, 2010, entitled, "Flame Focusing Ring for Stovetop Gas Burner and Universal Wok Support." The '671 patent discloses a very effective flame focusing ring.

As will be disclosed below, the present invention can be utilized with the flame focusing ring, providing an enhanced more secure and safe platform for the wok and enhanced performance of the focus ring. The present invention serves to optimize the flame signature at the optimal height. Laterally sliding leg assemblies provide for varying stove grates. As will be disclosed below, the present invention includes embodiments for varying the height of the wok support assembly depending on the size of the focus ring used and the grating of the stovetop.

A high percentage of the work of a chef in a Chinese restaurant, of a housewife or of one or more persons in another establishment which serves stir-fried foods consists in the manipulation of a wok, heavy with food, over a high flame. Such persons frequently or invariably experience arm and wrist pains after long hours of working, with the wok in hand, to turn out hundreds or even smaller numbers of courses of entrees consisting of or containing stir-fried foodstuffs. The result is a repetitive motion-induced injury known as or similar to the so-called carpal tunnel syndrome. In addition, the hand of a chef who is in charge of manipulating a wok is often burned by droplets of hot oil and/or sauces which are normally admixed to the solid foodstuffs in the bowl of a wok. As will be disclosed below, certain features of the present invention will mitigate these problems.

SUMMARY OF THE INVENTION

In a broad aspect, the present invention is a stovetop wok cooking system, including a wok support assembly and a flame focusing ring. The wok support assembly includes a truncated conical shaped fireproof main structure and spaced leg assemblies. The truncated conical shaped fireproof main structure includes a top wok support end portion and a bottom wok support end portion. The top wok support end portion includes a series of spaced bumps thereon to provide clearance for flames, and an upper lip. The bottom wok support end portion has a circular bottom support opening and a rounded rim. Each leg assembly includes a) a holder section having a holder section upper edge configured to slideably engage the upper lip; b) a pair of leg elements depending from the holder section and configured to extend from the bottom wok support end portion; and, c) a clip positioned between the pair of leg elements and depending from the holder section, while the wok support assembly is in an operative position. The clip is configured to slideably engage the rounded rim. Each leg assembly slides about the top wok support end portion and the bottom wok support end portion during use to an operative position for supporting the wok support assembly on varying stovetop designs. The flame focusing ring is adapted to be placed upon a stovetop and nested within the wok support assembly.

In an embodiment with fixed legs, each holder section, pair of leg elements, and clip of each leg assembly are integrally formed as one piece.

In an embodiment in which the leg spacing can be adjusted each leg assembly includes an adjustable leg assembly. Each holder section of each adjustable leg assembly, includes a holder section back plate having said holder section upper edge, and a pair of elongated track elements depending from the holder section back plate. Each of the pair of leg elements is supported by a leg element support member. The pair of elongated track elements in cooperation with the leg element support member secures the pair of leg elements for slidable adjustment of the pair of leg elements relative to the truncated conical shaped fireproof main structure of the wok support assembly.

In another embodiment, the wok is positionable on the wok support assembly. It includes a a fixed handle that is supported by the bowl at an inclination between 30 and 40 degrees from the rim of the bowl.

In another embodiment, the wok includes connecting means for adjustably connecting the handle to the bowl at the rim.

In yet another embodiment, the stovetop wok cooking system includes a shield depending from and extending from the bowl. The shield is interposed between the bowl and the handle to intercept particles of foodstuffs being stir-fried in and splattering from the bowl.

Other objects, advantages, and novel features will become apparent from the following detailed description of the invention when considered in conjunction with the accompanying drawings.

DETAILED DESCRIPTION OF THE INVENTION

Referring now to the drawings and the characters of reference marked thereon, FIGS. 1-4 illustrate a first embodiment of stovetop wok cooking system 10 of the present invention, designated generally as 10. In this embodiment, the stovetop wok cooking system 10 utilizes fixed legs, as will be described below in detail. The stovetop wok cooking system 10 in includes a wok support assembly 12 and a flame focusing ring 14. The wok support assembly 12 includes a truncated conical shaped fireproof main structure 16 and a plurality of spaced leg assemblies 18. The wok support assembly 12 supports a wok 20 and may be supported on varying stovetop designs, in FIG. 1, being supported on a stovetop surface 22 with the grating shown removed.

Figure 1:
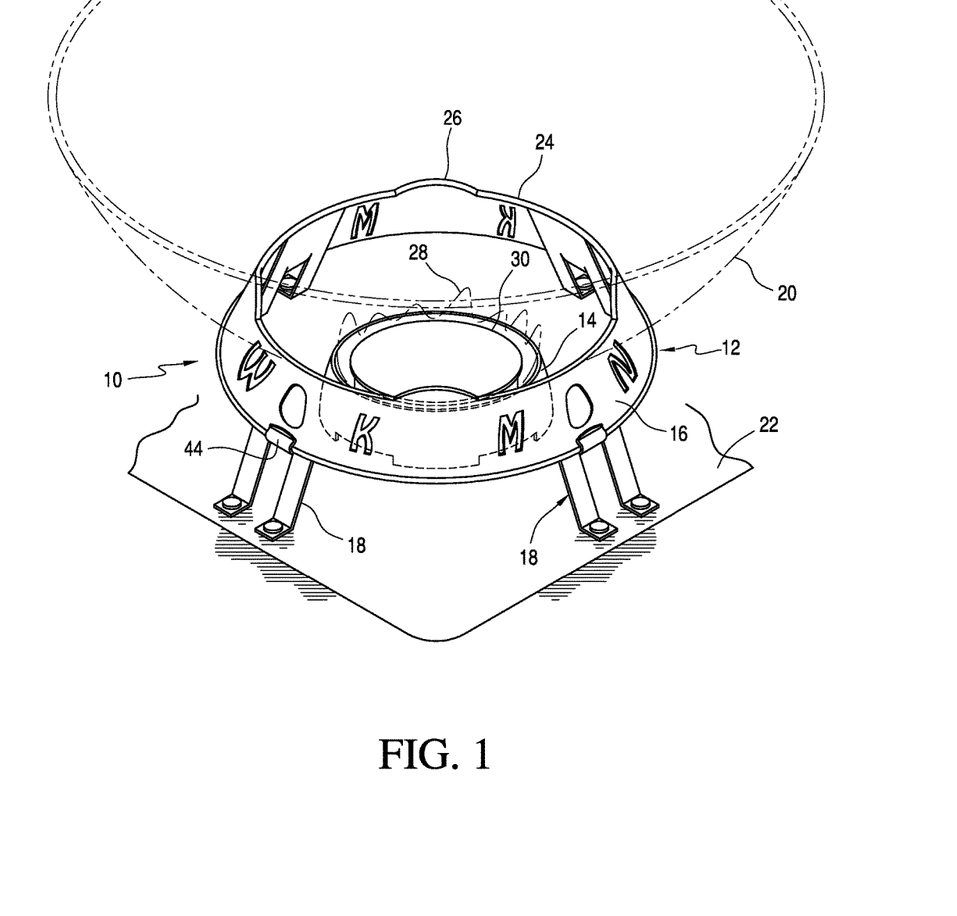
FIG. 1 is a perspective view of an embodiment of the stovetop wok cooking system of the present invention on a stovetop and supporting a wok.
Figures 2, 3, 4:
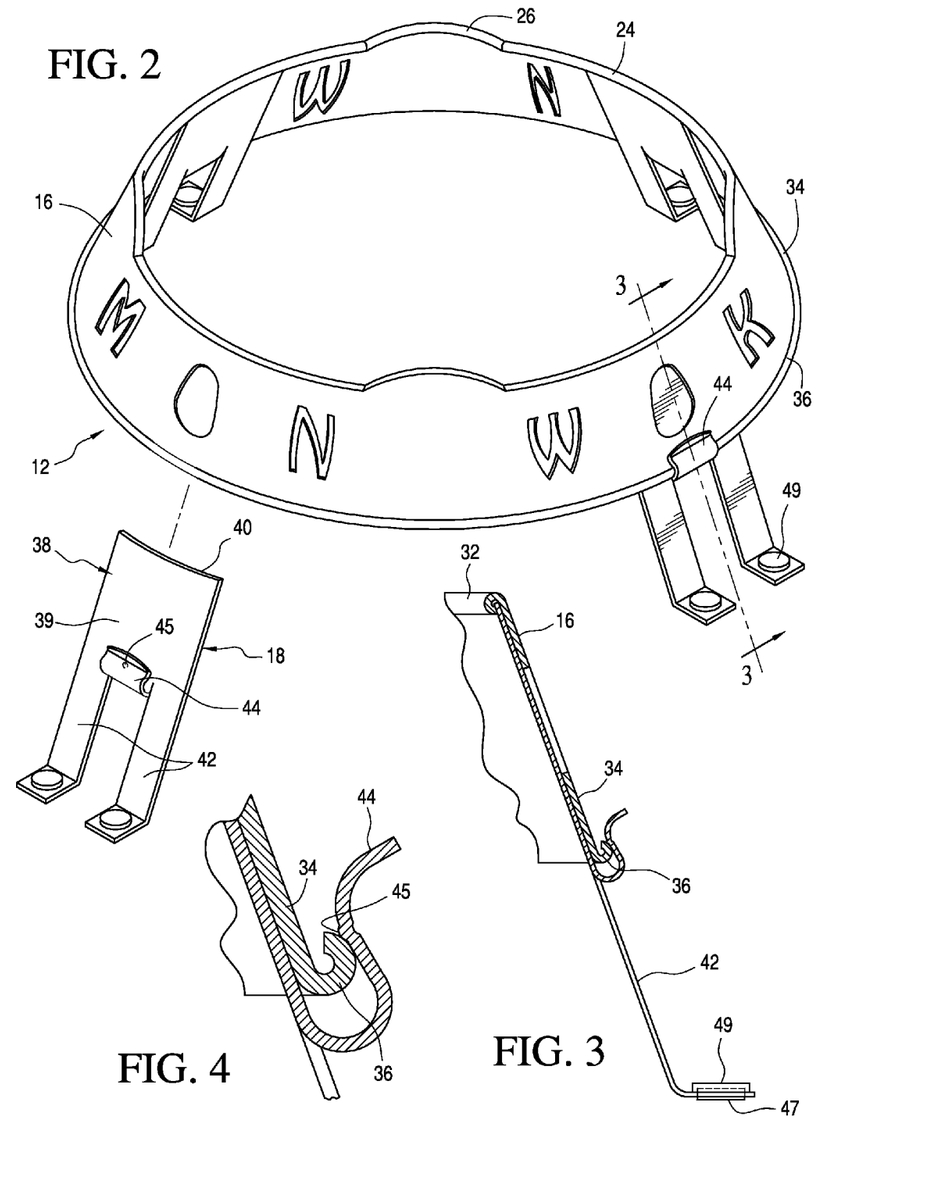
FIG. 2 illustrates the stovetop wok cooking system of FIG. 1 with a fixed leg assembly being detached from the main structure.
FIG. 3 is a view taken along line 3-3 of FIG. 2.
FIG. 4 is an enlarged view taken from FIG. 3, showing the engagement of the clip and the rim.

The main structure 16 includes a top wok support end portion 24 includes a series of spaced bumps 26 thereon to provide clearance for flames (shown by phantom lines 28 ascending from stove burner 30 in FIG. 1). The bumps 26 preferably provide about ¼ inch clearance for the overflow flames. The top wok support end portion 24, includes an upper lip 32, as shown in FIG. 3. A bottom wok support end portion 34 has a circular bottom support opening. The bottom wok support end portion 34 includes a rounded rim 36.

Each leg assembly 18 includes a holder section 38 with a holder section back plate 39 having a holder section upper edge 40 configured to slideably engage the upper lip 32. A pair of leg elements 42 depends from the holder section 38 and are configured to extend from the bottom wok support end portion 34. A clip 44 is positioned between the pair of leg elements 42 and depends from the holder section 38, while the wok support assembly is in an operative position. The clip 44 is configured to slideably engage the rounded rim. Thus, as will be discussed in detail below, each leg assembly 18 slides about the top wok support end portion 24 and the bottom wok support end portion 34 during use to an operative position for supporting the wok support on varying stovetop designs. In this embodiment, each holder section 38, pair of leg elements 42, and clip 44 of each leg assembly 18 are integrally formed as one piece. The clip 44 preferably has a dimple 45 for enhancing the securement of the clip 44 to the rim 36. Furthermore, as can be seen most clearly in FIG. 3, each leg element 42 preferably supports a high temperature resistant rare earth magnet 47. It may be supported by a magnet cavity 49 formed in the lower section of the leg element 42. During the manufacturing process the magnets are preferably pressed fit into each cavity with a drop of hi-temperature glue or epoxy. This is to prevent the magnet from dislodging from shock and heating over time.

Figures 5, 6, 7:
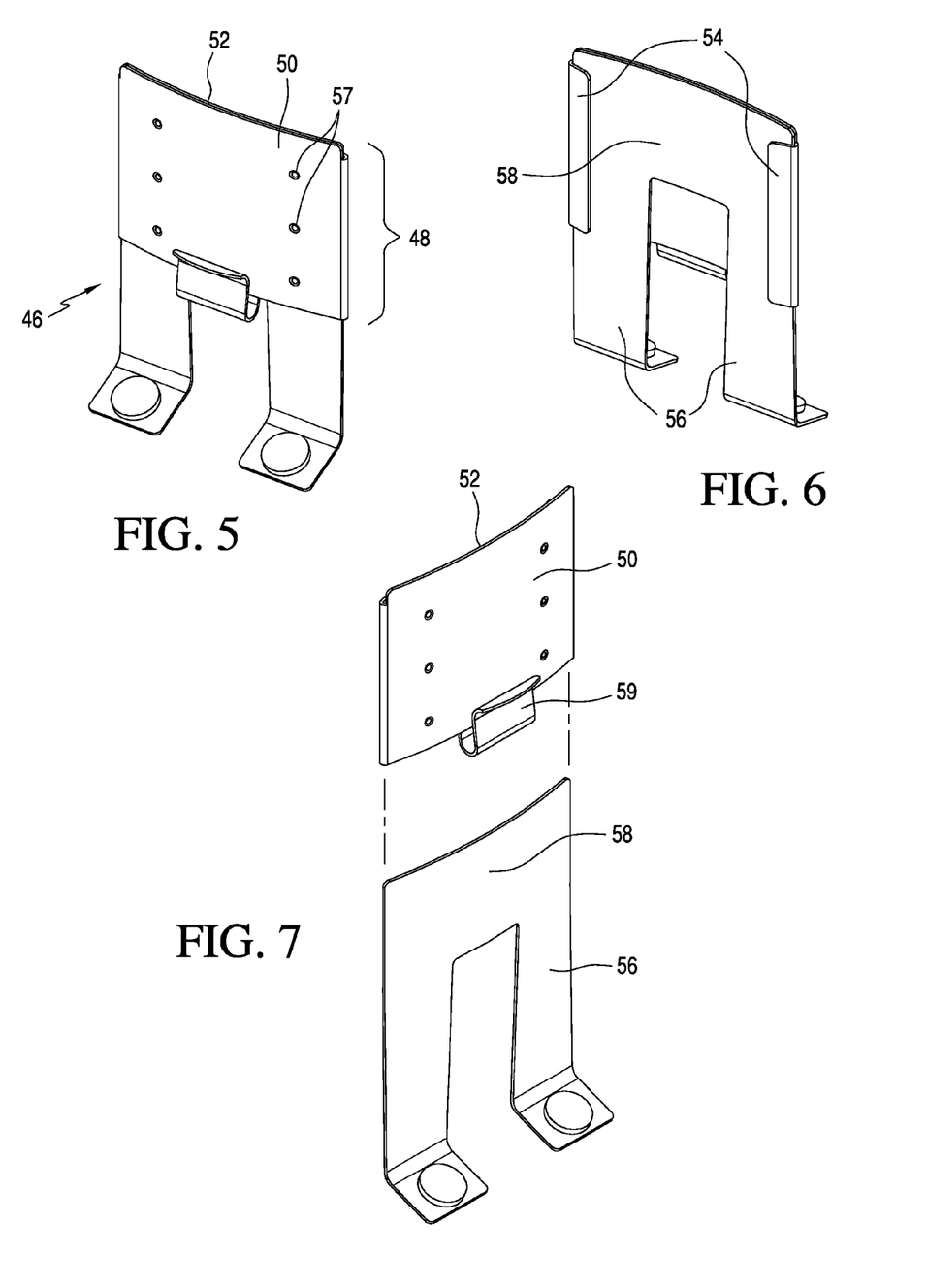
FIG. 5 is a front and side perspective illustration of an adjustable leg assembly.
FIG. 6 is a rear and side perspective illustration of the adjustable leg assembly of FIG. 5.
FIG. 7 is an exploded perspective illustration of an adjustable leg assembly.

Referring now to FIGS. 5-7, another embodiment of a leg assembly is illustrated, designated generally as 46, in which the legs are adjustable. In this adjustable leg assembly 46, each holder section 48 of each leg assembly 46, includes a holder section back plate 50 having a holder section upper edge 52, and a pair of elongated track elements 54 depending from the holder section back plate 50. Each of the pair of leg elements 56 is supported by a leg element support member 58. The pair of elongated track elements 54 in cooperation with the leg element support member 58 secures the pair of leg elements 56 for slidable adjustment of the pair of leg elements 56 relative to the main structure of the wok support assembly. The edge portion of leg element support member 58 rests at each of three pairs of six pimples stops 57. These pairs of horizontal pimple stops 57 allow, for example, about one-half inch height adjustment of the main structure 16. This adds additional flexibility and functionality to flame intensity and wok stability. The clip 59 is securely attached to a lower end of the holder section back plate 50.

Figure 8:
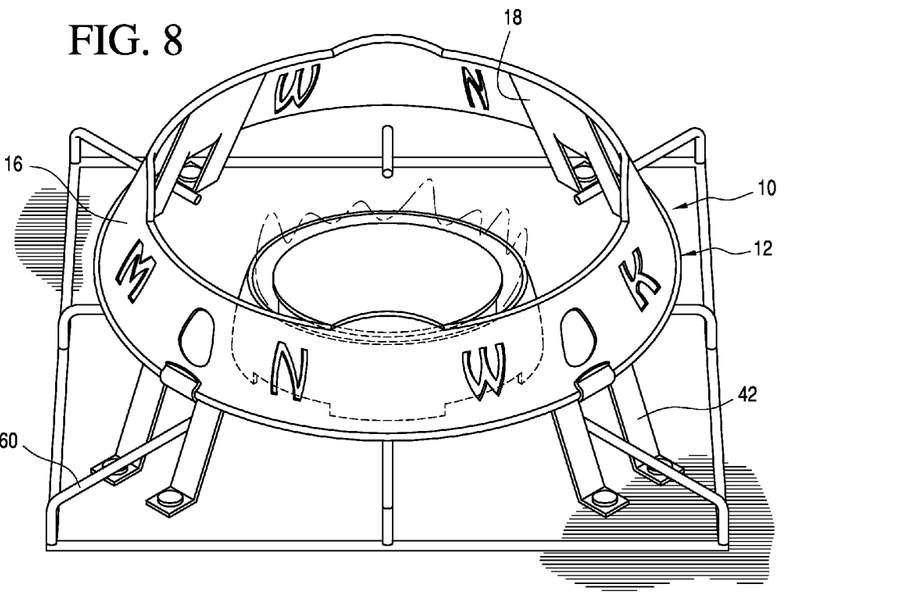
FIG. 8 is a perspective view of an embodiment of the stovetop wok cooking system of the present invention on a stovetop with a grating, with fixed leg assemblies.
Figure 9:
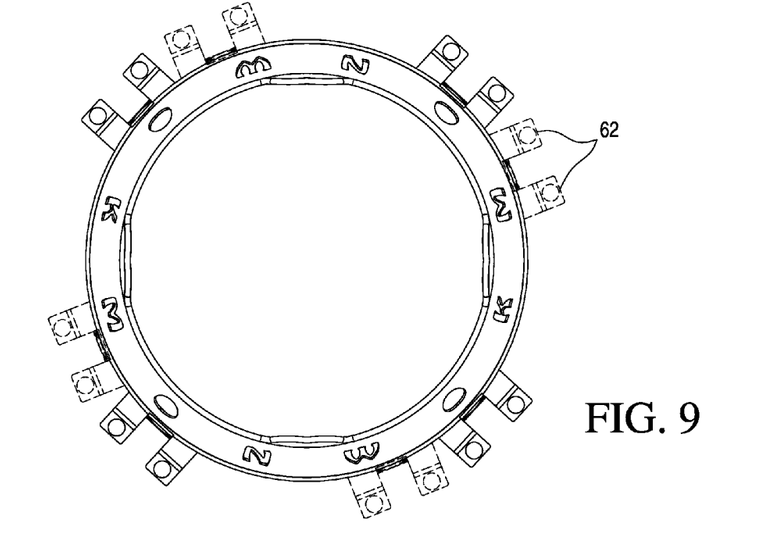
FIG. 9 is a top view of the embodiment of FIG. 8, showing adjustability of the fixed leg assemblies about the circumference of the main structure thus adjusting the leg assembly spacing.

FIG. 8 illustrates the use of the stovetop wok cooking system 10 without removal of the grating 60. This figure illustrates this use with fixed leg assemblies 18. The main structure 16 of the wok support assembly 12 is supported at a distance above the grating 60. As shown by phantom lines 62 in FIG. 9, the legs can be rotated about the circumference of the main structure 16 in accordance with the specific characteristics of the grating 60. Stovetops have different sizes and orientations. For, example the grating pattern may be rectilinear. However, regardless of the configuration of a particular stove grating design, the leg assemblies can be slidable relative to the main structure so that each leg assembly straddles securely between each grate on a substantially even plane as the other leg assemblies.

Figure 10:
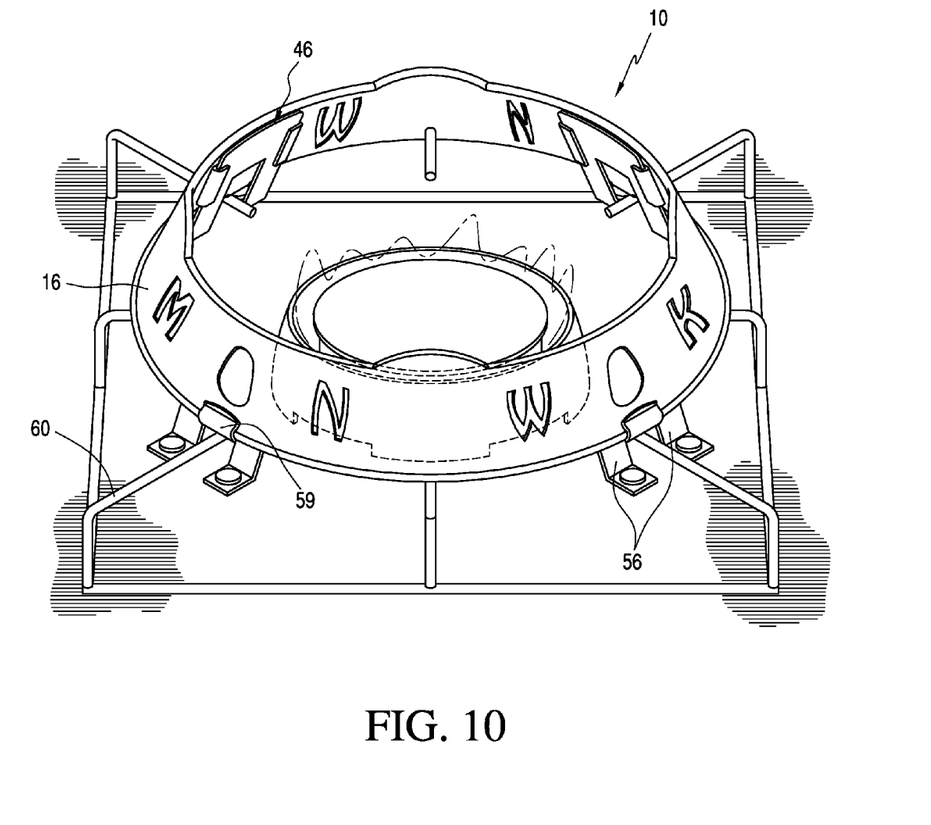
FIG. 10 is a perspective view of an embodiment of the stovetop wok cooking system of the present invention on a stovetop with a grating, the embodiment having adjustable leg assemblies.

Referring now to FIG. 10, the use of the stovetop wok cooking system 10 without removal of the grating 60 is illustrated. However, in this instance, use of adjustable leg assemblies 46 is shown. The main structure 16 of the wok support assembly 12 is supported by the clip 59 above the grating 60.

Fixed leg assemblies accommodate about 80%- 90% of western type stovetop configurations. The adjustable leg assemblies are an enhancement for providing height adjustment to optimize the flame signature.

The flame focusing ring 14 is preferably of the type disclosed in present applicant's U.S. Pat. No. 7,694,671, entitled "FLAME FOCUSING RING FOR STOVETOP GAS BURNER AND UNIVERSAL WOK SUPPORT." U.S. Pat. No. 7,694,671 is incorporated herein by reference, in its entirety. The flame focusing ring (or flame concentrating ring) has an inwardly curved upper wall portion and air inlet vents at its base for encircling a gas burner and directing the flames upwardly and inwardly to focus on the bottom center of a wok. The temperatures achieved as a result of using a flame focusing ring approach about 700-800° F. or greater. Normally about a maximum of only about 600° F. is achieved without a focus ring. With the focus ring in place, greater heat is reached faster in the center of the wok. Additionally, the optimum heat can achieved without significant temperature drop when food is introduced into the wok.

The main structure and leg elements can be formed of a suitable high temperature material, preferably stainless steel. Furthermore the flame focusing ring is also made of a suitable high temperature material, preferably stainless steel.

Figure 11:
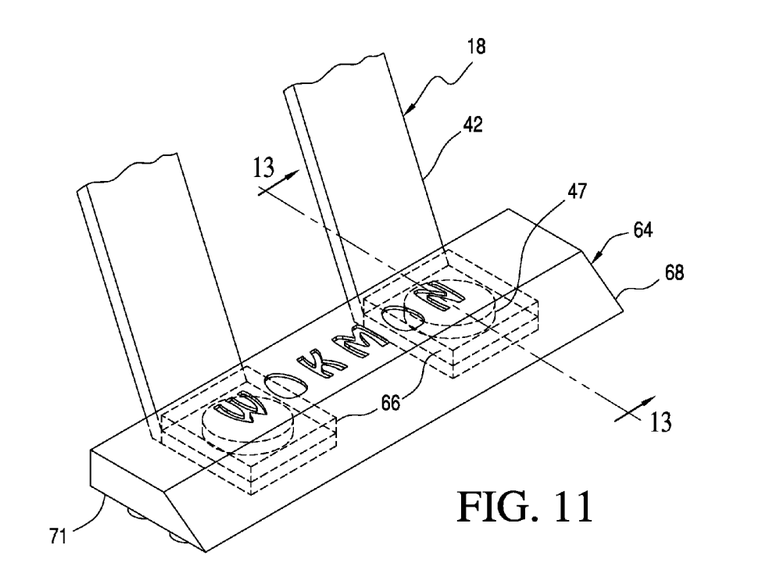
FIG. 11 is a perspective illustration of the lower parts of a leg assembly to show use of a silicone boot.
Figure 12:
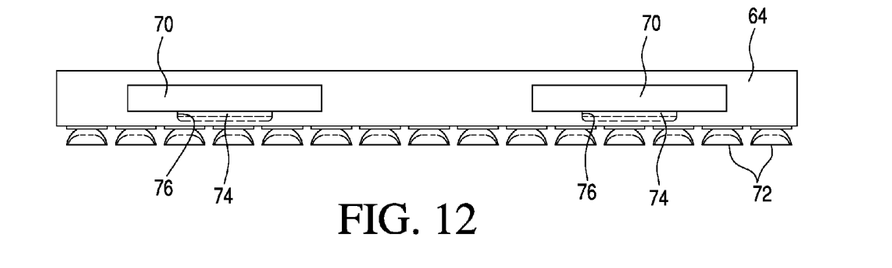
FIG. 12 is a rear view of the lower section of the lower parts of a leg assembly and the silicone boot assembly of FIG. 11.
Figure 13:
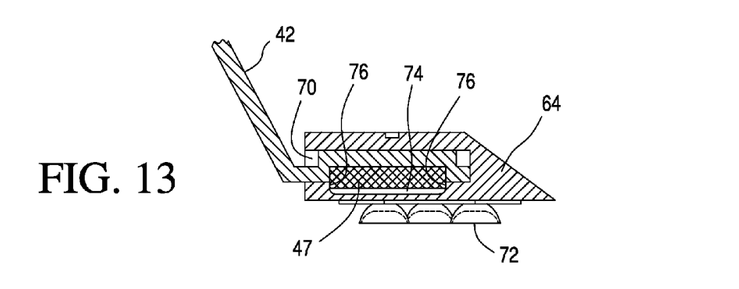
FIG. 13 is a view taken along line 13-13 of FIG. 11.

Referring now to FIGS. 11-13, utilization of a silicone boot assembly 64 is shown at the bottom of a leg assembly 18. Each silicone boot assembly 64 is configured to fit upon a lower end 66 of a pair of the leg elements. The silicone boot assembly 64 includes a silicone boot element 68 having an opening 70 configured to accommodate the lower end 66 of the pair of leg elements. The silicone boot element 68 has a bottom surface 71 thereon. A plurality of silicone suction cups 72 are affixed to the bottom surface. Preferably they are molded into the silicone boot element 68.

Preferably the opening 70 in the silicone boot element 68 also accommodates a magnet for each leg element. In an embodiment, the silicone boot assembly 64 includes a pair of boot assembly magnet cavities 74 formed therein, each boot assembly magnet cavity 74 being associated with a magnet 47, each boot assembly magnet cavity 74 having sidewalls for constraining movement of a magnet 47 supported therein and thereby constraining movement of an associated leg element 42.

Figure 14:
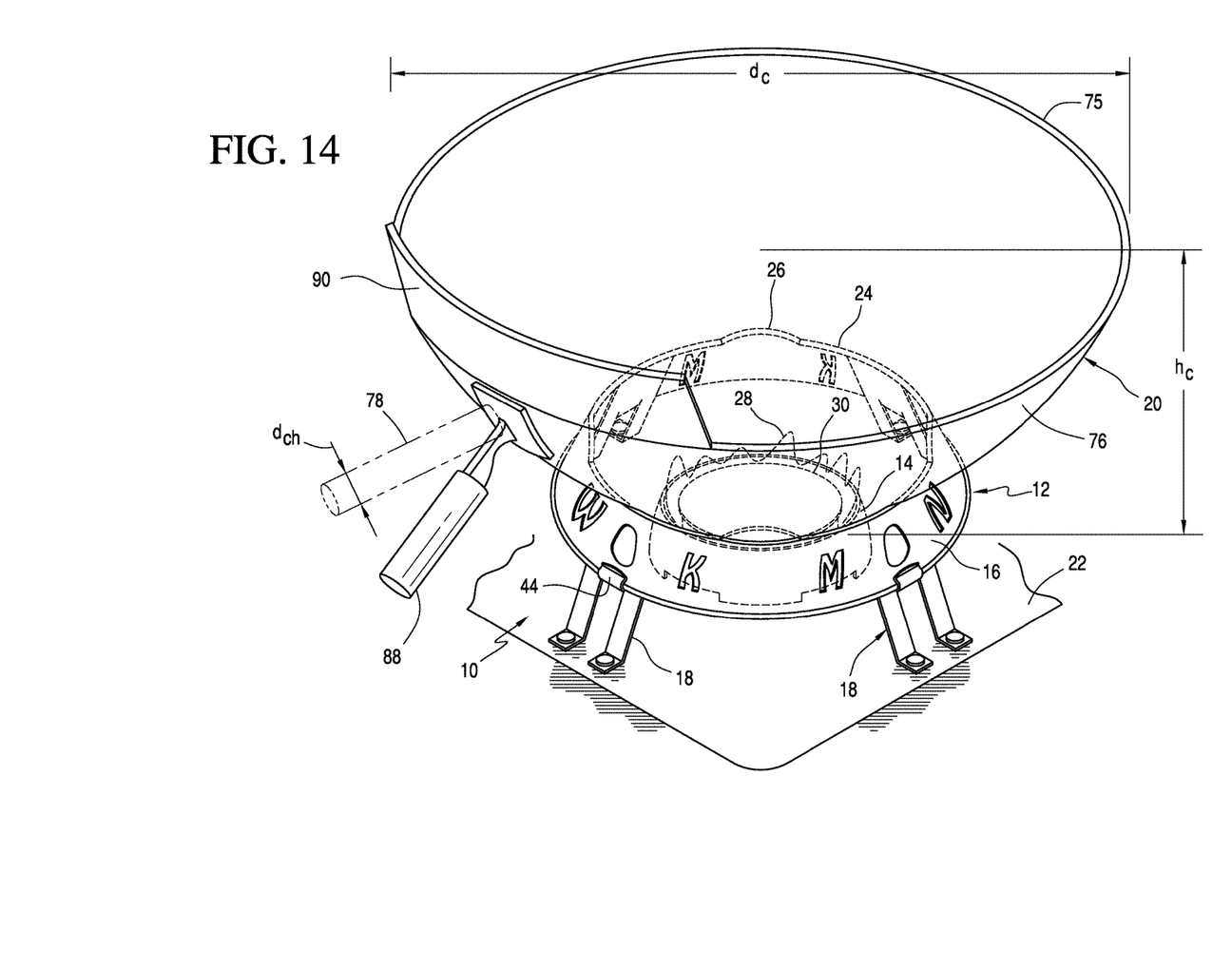
FIG. 14 is a perspective view of an embodiment of the stovetop wok cooking system of the present invention on a stovetop and supporting a wok with a fixed handle.
Figure 15:
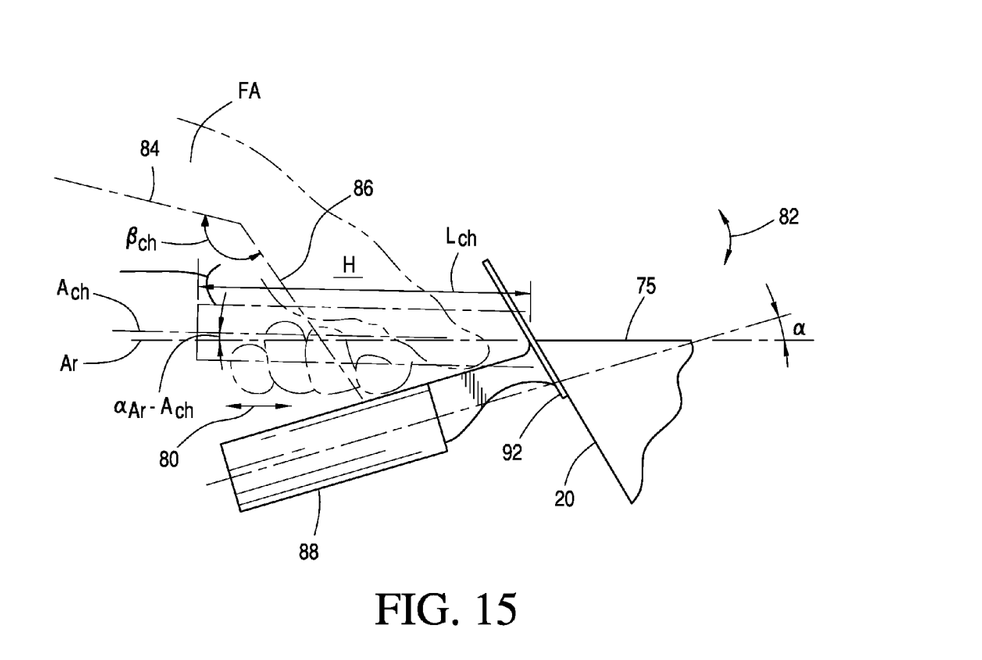
FIG. 15 is a fragmentary side view of a portion of embodiment of FIG. 14.

As a rule, a conventional stir-fry wok has a substantially hemispherical body or bowl of mild steel and a handle resembling an elongated cylinder and sloping upwardly from the rim of the bowl at an angle of or slightly exceeding 5 degrees. FIGS. 14-15 show a bowl 76 of a wok 20 with a conventional cylindrical handle 78, shown in phantom lines. The diameter $d_c$ of the bowl 76 is generally in the range of 14" (335 mm) and its height $h_c$ in the range of 4½" (115 mm). The weight of the wok 20 is generally in the range of between about 1.2 kg and 1.4 kg. The conventional handle 78 may generally have a length $L_{ch}$ of between about 7" and 8" (180-200 mm) and a diameter $D_{ch}$ of between about 1.2" and 1.5" (30-38 mm). The angle ($\alpha_{Ar\text{-}Ach}$) between the axis of the conventional handle 78 (Ach) and the plane Ar of the rim 75 of the bowl 76 is typically in the range of 5 degrees.

As a rule, a chef or another person in charge of utilizing the wok holds the conventional handle 78 with her or his left hand and shakes it quickly and forth in directions indicated by the double-headed arrow 80 as well as up and down as indicated by the double-headed arrow 82. This causes a mixing and simultaneous cooking of the contents of the bowl 76 over a flame. The combined weight of the wok 20 and of the contents of its bowl 76 is generally or exceeds about 4 lbs, and such weight is being shaken several hundred times per hour during the busy hours of a shift in the kitchen of a restaurant. Due to the customary inclination of the conventional handle 78 relative to the plane of the rim 75 of the bowl 76, the user of the wok 20 employs the weaker position range of her or his hand and arm muscles. This is indicated by the obtuse angle $\beta_{ch}$ between the center lines $FA_{cl1}$, $FA_{cl2}$ of the forearm FA and the hand H of the user. When the muscles of the forearm LA and the hand H are to cooperate in an optimal manner, the angle $\beta_{ch}$ should be at least close to 180 degrees, i.e., the center lines 84, 86, should be at least substantially aligned.

U.S. Pat. No. 4,653,468, issued on Mar. 31, 1987 to Lemme et al. for "COOKWARE HANDLE," discloses a cooking pan wherein the bowl has a flat bottom part and the handle is indirectly borne by the bowl so that its longitudinal axis makes with the plane of the edge or rim surrounding the open top of the bowl an angle of between 15 degrees and 45 degrees in order to increase the comfort of the user.

U.S. Pat. No. 20030079614, published on May 1, 2003 to T. T. Shu for "ERGONOMIC STIR-FRYING COOKWARE," discloses a utensil, such as a wok, for stir-frying foodstuffs that has a bowl with a substantially oval rim, an elongated handle having a non-circular cross-sectional outline, and joints for connecting the handle to the bowl in such a way that the handle is adjustable relative to the bowl about at least one of two axes one of which extends substantially radially and the other of which extends substantially tangentially of the bowl. A shield is or can be interposed between the handle and the bowl to intercept particles of food splashing from the bowl during stir-frying of foodstuffs above a flame.

The disclosure of each patent and/or patent application and/or other publication identified in the specification of the present application is incorporated herein by reference.

Still referring to FIGS. 14-15, in accordance with one embodiment of the present invention the wok 20 includes a fixed handle 88. The fixed handle 88 is supported by the bowl at an inclination a between 30 and 40 degrees from the rim 75 of the bowl 76. Preferably, it is at an angle of 35 degrees.

The stovetop wok cooking system 10 preferably includes a heat resistant shield 90 depending from and extending from the bowl 76. The shield 90 is interposed between the bowl 76 and the handle 88 to intercept particles of foodstuffs being stir-fried in and splattering from the bowl. The shield 90 may be carried by a bracket support 92 or other support that secures the handle 88 or there may be no support at all. Or, the shield 90 may be independent of the support bracket 92 that supports the bowl. The handle can be riveted, welded or otherwise secured to the support bracket 92 and/or bowl 76. The same applies for the connection between the shield 90 and the support bracket and for the connection between the support bracket 92 and the body of the bowl.

It has been ascertained that a handle having a length of about 6" (150 mm) is quite satisfactory. This handle can be made of a lightweight material (a presently preferred material is wood) having satisfactory heat insulating properties. The external surface of the handle is or can be textured.

In another embodiment, the wok may have a non-circular outline. Such outline is preferably obtained by removing some material from the two lateral sides of the bowl so that the rim of the bowl is not located in a single plane. As mentioned above, a presently popular conventional wok can employ a bowl having a diameter in the range of 14" (355 mm) and a depth of about 4½" (115 mm). The contour of the bowl can vary, depending upon the manufacturer but, as a rule, it is always bounded by a convex external surface and a complementary concave internal surface.

Figure 16:
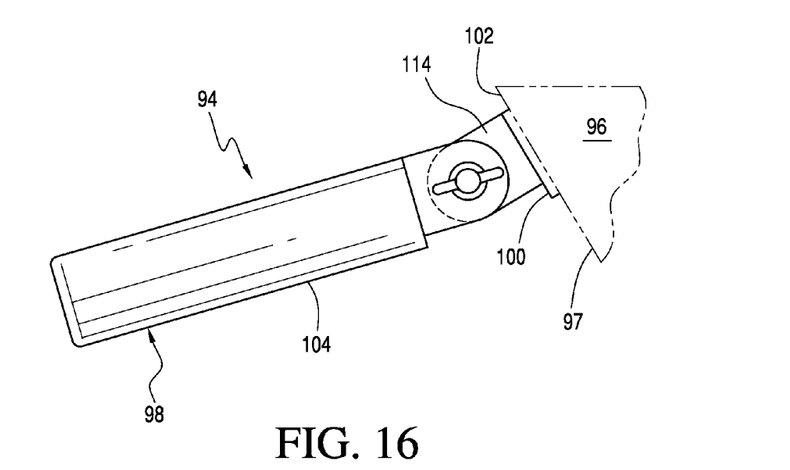
FIG. 16 is side view of an embodiment of a wok with an adjustable handle.
Figure 17:
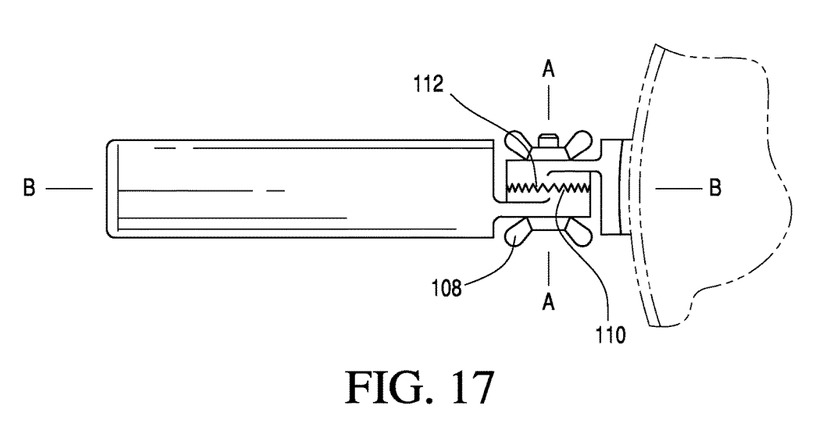
FIG. 17 is a top view of the embodiment of FIG. 16.

Referring now to FIGS. 16-17, another embodiment of the present invention is illustrated, designated generally as 94, including a wok 96 comprising a bowl 97, a composite handle 98, a support 100 (such as a bracket) affixed to and extending beyond the edge or rim 102 surrounding the open top of the bowl 97. This embodiment may also include a heat-resistant shield (not shown) affixed to and extending upwardly beyond the bracket 100, as discussed above. The handle 98 is adjustably secured to the bracket 100 in such a way that it can pivot about an axis A-A which is normal to the longitudinal axis B-B of the elongated tubular handgrip portion 104 of the handle 98 and substantially tangential to the adjacent portion of the rim 102.

In order to change the angular position of the handle 98, the user of the wok 96 turns a wing nut 106 mating with a threaded bolt 108 which defines the axis A-A and normally cooperates with the wing nut 106 to prevent the handgrip portion 104 from pivoting about such axis. The handgrip portion 104 includes a serrated handgrip end face 110. When the wing nut 106 is loosened a complementary serrated wing nut end face 112 of a bracket support assembly 114 can rotate relative to the serrated handgrip end face 110. Thus, the handgrip portion 104 can be rotated about the axis A-A relative to the utensil 1. The cooperating serrations normal prevent relative rotation therebetween.

Figure 18:
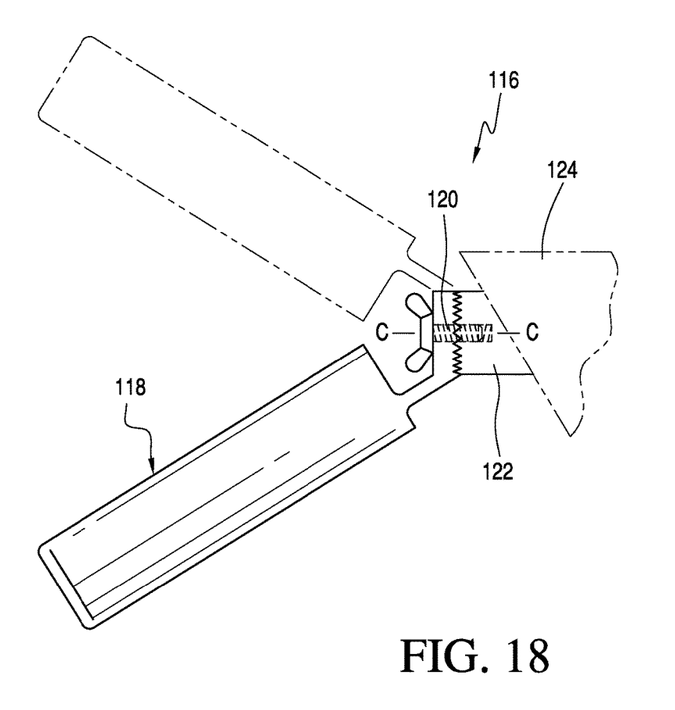
FIG. 18 is another embodiment of a wok with an adjustable handle.

In another embodiment, designated generally as 116 and illustrated in FIG. 18, another type of adjustable handle 118 is utilized with a wok system. In this embodiment a single threaded bolt 120 is utilized that extends into a bowl extension 122 of the bowl 124. This embodiment provides varying angles. It results in potential enhanced wrist comfort (easing strain and leverage) depending on the user's specific needs. For example, the handle 118 can be turned gradually to the right or left depending on whether the user is right handed or left handed.

Other embodiments and configurations may be devised without departing from the spirit of the invention and the scope of the appended claims.

The invention claimed is:
1. A stovetop wok cooking system, comprising:
a) a wok support assembly comprising a truncated conical shaped fireproof main structure and a plurality of spaced leg assemblies,
    wherein said truncated conical shaped fireproof main structure includes:
    a top wok support end portion including a series of spaced bumps thereon to provide clearance for flames, and an upper lip; and,
    a bottom wok support end portion having a circular bottom support opening, said bottom wok support end portion including a rounded rim; and,
    wherein each leg assembly of said plurality of spaced leg assemblies, comprises:
    a holder section having a holder section upper edge slideably engaging said upper lip;
    a pair of leg elements extending downwardly from said holder section and extending from said bottom wok support end portion; and,
    a clip positioned between said pair of leg elements and extending outwardly from said holder section, wherein while the wok support assembly is in an operative position, said clip slideably engages said rounded rim of the bottom wok support end portion;
    wherein each leg assembly slides about the top wok support end portion and the bottom wok support end portion during use to an operative position for supporting the wok support assembly on varying stovetop designs; and, b) a flame focusing ring adapted to be placed upon a stovetop and nested within said wok support assembly.

2. The stovetop wok cooking system of claim 1, wherein each holder section, said pair of leg elements, and said clip of each leg assembly are integrally formed as one piece.

3. The stovetop wok cooking system of claim 1, wherein each leg assembly comprises an adjustable leg assembly:
   a) each holder section of each adjustable leg assembly, comprises: a holder section back plate having said holder section upper edge, and a pair of elongated track elements depending from the holder section back plate; and,
   b) each of said pair of leg elements is supported by a leg element support member,
      wherein said pair of elongated track elements in cooperation with the leg element support member secures the pair of leg elements for slidable adjustment of the pair of leg elements relative to the truncated conical shaped fireproof main structure of the wok support assembly.

4. The stovetop wok cooking system of claim 3, wherein said clip is securely attached to a lower end of said holder section back plate.

5. The stovetop wok cooking system of claim 1, wherein each leg element supports a high temperature resistant rare earth magnet.

6. The stovetop wok cooking system of claim 1, each leg element including a magnet cavity configured to support a high temperature resistant rare earth magnet.

7. The stovetop wok cooking system of claim 1, further comprising a plurality of boot assemblies, each boot assembly being configured to fit upon a lower end of the pair of leg elements.

8. The stovetop wok cooking system of claim 1, further comprising a plurality of silicone boot assemblies, each silicone boot assembly being configured to fit upon a lower end of the pair of leg elements.

9. The stovetop wok cooking system of claim 1, further comprising a plurality of silicone boot assemblies, each silicone boot assemblies being configured to fit upon a lower end of the pair of leg elements, each silicone boot assembly of said plurality of silicone boot assemblies, comprising:
   a) a silicone boot element having an opening configured to accommodate the lower end of the pair of leg elements, said silicone boot element having a bottom surface thereon; and,
   b) a plurality of silicone suction cups affixed to the bottom surface.

10. The stovetop wok cooking system of claim 1, further comprising a plurality of silicone boot assemblies, each silicone boot assemblies being configured to fit upon a lower end of the pair of leg elements, each silicone boot assembly of said plurality of silicone boot assemblies, comprising:
   a) a silicone boot element having an opening configured to accommodate the lower end of the pair of leg elements and also accommodate a magnet for each leg element, said silicone boot element having a bottom surface thereon; and,
   b) a plurality of silicone suction cups affixed to the bottom surface,
      wherein said silicone boot assembly comprises a pair of boot assembly magnet cavities formed therein, each boot assembly magnet cavity being associated with a magnet, each boot assembly magnet cavity having sidewalls for constraining movement of a magnet supported therein and thereby constraining movement of an associated leg element.

11. A stovetop wok cooking system, comprising:
a) a wok support assembly comprising a truncated conical shaped fireproof main structure and a plurality of spaced leg assemblies,
   wherein said truncated conical shaped fireproof main structure includes:
   a top wok support end portion including a series of spaced bumps thereon to provide clearance for flames, and an upper lip; and,
   a bottom wok support end portion having a circular bottom support opening, said bottom wok support end portion including a rounded rim; and,
   wherein each leg assembly of said plurality of spaced leg assemblies, comprises:
   a holder section having a holder section upper edge slideably engaging said upper lip;
   a pair of leg elements extending downwardly from said holder section and extending from said bottom wok support end portion; and,
   a clip positioned between said pair of leg elements and extending outwardly from said holder section, wherein while the wok support assembly is in an operative position, said clip slideably engages said rounded rim of the bottom wok support end portion;
   wherein each leg assembly slides about the top wok support end portion and the bottom wok support end portion during use to an operative position for supporting the wok support assembly on varying stovetop designs;
b) a flame focusing ring adapted to be placed upon a stovetop and nested within said wok support assembly
c) a wok positionable on said wok support assembly, comprising:
   a bowl having a rim; and
   a fixed handle, said fixed handle being supported by said bowl at an inclination between 30 and 40 degrees from the rim of the bowl.

12. The stovetop wok cooking system of claim 11, further comprising a shield depending from and extending from said bowl, said shield being interposed between said bowl and said handle to intercept particles of foodstuffs being stir-fried in and splattering from said bowl.

13. A stovetop wok cooking system, comprising:
a) a wok support assembly comprising a truncated conical shaped fireproof main structure and a plurality of spaced leg assemblies,
   wherein said truncated conical shaped fireproof main structure includes:
   a top wok support end portion including a series of spaced bumps thereon to provide clearance for flames, and an upper lip; and,
   a bottom wok support end portion having a circular bottom support opening, said bottom wok support end portion including a rounded rim; and,
   wherein each leg assembly of said plurality of spaced leg assemblies, comprises:
   a holder section having a holder section upper edge slideably engaging said upper lip;
   a pair of leg elements extending downwardly from said holder section and extending from said bottom wok support end portion; and,
   a clip positioned between said pair of leg elements and extending outwardly from said holder section, wherein while the wok support assembly is in an operative position, said clip slideably engages said rounded rim of the bottom wok support end portion;

wherein each leg assembly slides about the top wok support end portion and the bottom wok support end portion during use to an operative position for supporting the wok support assembly on varying stovetop designs;

b) a flame focusing ring adapted to be placed upon a stovetop and nested within said wok support assembly c) a wok positionable on said wok support assembly, comprising:
   a bowl having a rim;
   a handle; and,
   connecting means for adjustably connecting said handle to the bowl at said rim.

14. The stovetop wok cooking system of claim 13, wherein said connecting means comprises at least one joint securing said handle to said bowl for movement about at least one axis between a plurality of different positions.

15. The stovetop wok cooking system of claim 13, wherein said handle is elongated and has a longitudinal axis coinciding with said longitudinal axis, said connecting means further comprising means for releasably fixing said handle in any one of said plurality of different positions.

16. The stovetop wok cooking system of claim 13, wherein said handle is elongated and has a longitudinal axis coinciding with said longitudinal axis, said connecting means further comprising means for releasably fixing said handle in any one of said plurality of different positions.

17. The stovetop wok cooking system of claim 13, wherein said connecting means comprises a single threaded bolt that extends into a bowl extension of the bowl.

\* \* \* \* \*